Jan. 16, 1968  G. R. GROSCLAUDE ET AL  3,363,788
CAR TOP BOAT MOUNTS
Filed Dec. 3, 1965  2 Sheets-Sheet 1
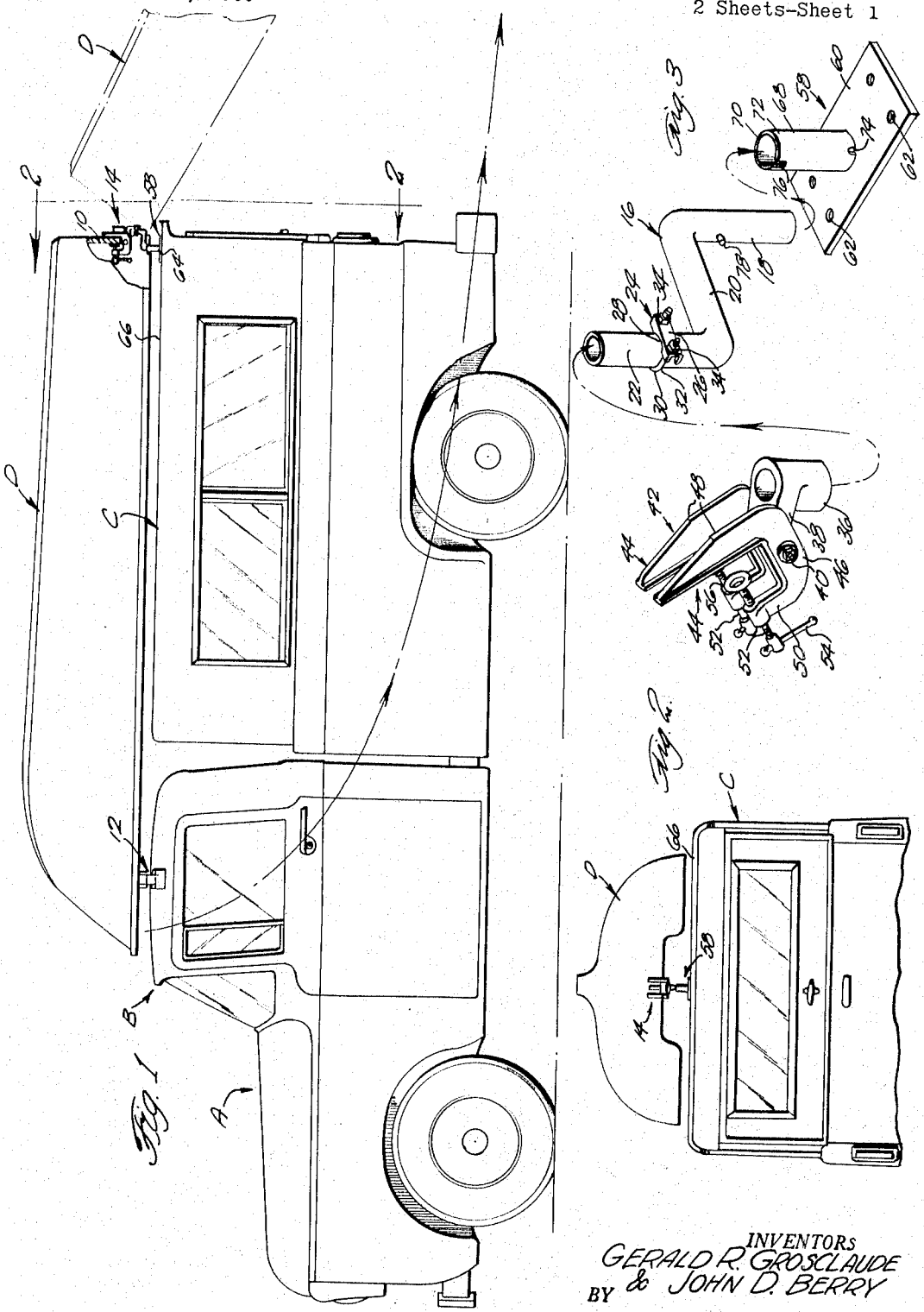
INVENTORS
GERALD R. GROSCLAUDE
& JOHN D. BERRY
BY
Berman, Davidson & Berman
ATTORNEYS

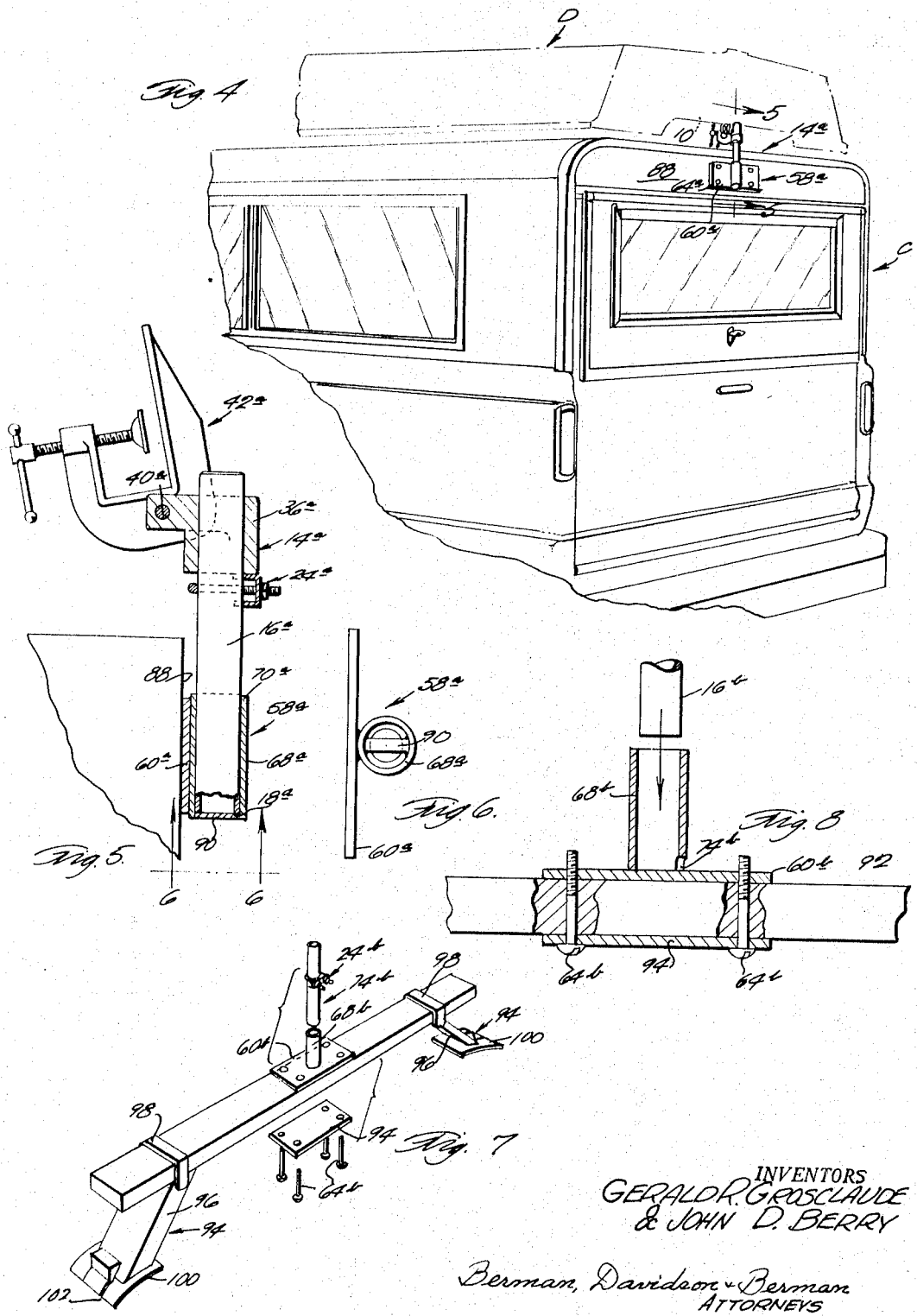

United States Patent Office 3,363,788
Patented Jan. 16, 1968

3,363,788
CAR TOP BOAT MOUNTS
Gerald R. Grosclaude, 375 Cottonwood, Richland, Wash. 99352, and John D. Berry, 1604 W. 7th Place, Kennewick, Wash. 99336
Filed Dec. 3, 1965, Ser. No. 511,414
4 Claims. (Cl. 214—450)

ABSTRACT OF THE DISCLOSURE

One-man boat carrier structures which feature mounting on or adjacent to the top of a vehicle body, adjacent to the rear end thereof, so as to avoid interference with access to the rear of the vehicles, such as the tailgate of a station wagon, the structures involving pivotal arrangements which enable one man to swing a light boat, unassisted, upwardly and forwardly onto the top of the vehicle body, and as easily unload the boat off the vehicle top.

---

This invention relates to boat mounts for the tops of vehicles, such as pick-up campers, camp trailers, station wagons, and the like.

The primary object of the invention is the provision of simple, efficient, and easily installed mounts, of the kind indicated, which enable one-man loading and unloading of boats, and which avoid any interference with free and unencumbered access to the rear doors of vehicles of the indicated types. It is to be noted that the rear components of the present boat mounts are adapted, in the cases of installations on sedan type vehicles, to be installed on post type rear mounts, such as are exemplified in Patent No. 2,895,628.

Another object of the invention is the provision of mounts of the character indicated above, which have swingable boat clamp assemblies, adapted to be clamped on the transoms of boats, which enable one-man loading of boats simply by swinging the boats upwardly, forwardly, and laterally onto the vehicle tops; and unloading of the boats by mere reversal of these steps.

A further object of the invention is the provision of rear boat mounts, of the character indicated above, for installation on the rear of the bodies of vehicles of the indicated character, to be used in conjunction with suitable forward boat mount components, mounted on the tops of foreparts of the vehicle bodies, the said rear mount components having brackets which are interchangeable to enable installation, either upon the vehicle body tops, or upon rear vertical portions of the bodies.

In the drawings:

FIGURE 1 is a side elevation of a pick-up camper, showing a boat loaded thereon by means of a mount of the present invention, the boat being shown in phantom lines preliminary to being so loaded;

FIGURE 2 is a rear end elevation, taken from the lines 2—2 of FIGURE 1;

FIGURE 3 is an enlarged and exploded perspective view of the rear mount component of FIGURES 1 and 2;

FIGURE 4 is a fragmentary rear perspective view of the vehicle of FIGURE 1, showing another form of rear mount installed on a rear vertical surface of the vehicle;

FIGURE 5 is an enlarged fragmentary vertical section, taken on the line 5—5 of FIGURE 4;

FIGURE 6 is a bottom plan view of the rear mount of FIGURES 4 and 5;

FIGURE 7 is a contracted exploded perspective view, on a reduced scale, showing a further form of rear mount component of the present invention, for car top installation; and, FIGURE 8 is an enlarged fragmentary vertical section taken through FIGURE 7.

Referring in detail to the drawings, and first to FIGURES 1 to 3 thereof, a pick-up camper vehicle A is shown, which involves a pick-up truck having a forward cab B, and a rear open body carrying a camper body C. A boat D, of a length to overlie the body C and the cab B, has a transom 10.

A front boat mount component 12, of any suitable horizontal transverse form, is suitably secured upon the top of the cab B, or the forward portion of the camper body C, for securably supporting the forepart of the boat D.

The rear mount 14 comprises a post 16 composed of a lower perpendicular portion 18, merging, at its upper end, into lateral horizontal portion 20, which, at its outer end, merges into an upper perpendicular portion 22, the post 16 being preferably tubular in form.

A vertically adjustable stop 24 is circumposed on the upper post portion 22, and can comprise a channel saddle 26 having aligned arcuate notches 28, in the edges of its sidewalls, fitting one side of the post portion 22, and a U-bolt 30 embracing the opposite side of the post portion 22, the legs 32 of the U-bolt being extended through the ends of the saddle 26, and secured by means of nuts 34.

Rotatably engaged on the upper post portion 22, and resting upon the saddle 26, is a sleeve 36 having a lateral horizontal arm 38 extending from its upper end. The arm 38 is traversed, at its outer end, by a pivot bolt 40, on which a boat transom clamp assembly 42 is supported.

The clamp assembly 42 comprises a pair of laterally spaced C-clamps 44 whose cross members 46 are journalled on the pivot bolt 40, and bear against opposite sides of the arm 38. The C-clamps have upstanding long rear legs 48, which are parallelly spaced from short front legs 50. The short legs 50 have clamping screws 52 threaded therethrough, which are provided, at their outer ends, with handles 54, and with rotary abutments 56, on their rear ends.

The rear mount 14 is supported on the top of the camper body C, at the rear end thereof, by means of a bracket 58, which comprises a flat, transversely elongated base plate 60, provided with holes 62, at its corners, through which attaching means, such as self-threading screws 64, are adapted to be threaded into the top 66 of the camper body C.

A fixed perpendicular tube 68 rises from the center of the base plate 60 and has a squared upper end 70. The side wall 72, of the tube 68, is formed, at its lower end, with a drain hole 74. A vertical detent slot 76 is formed in the side wall 72 and opens to the upper end 70, to receive a lateral detent pin 78, on the lower portion 18 of the mount post 16.

The lower post portion 18 is adapted to be downwardly engaged in the tube 68, with its lower end 18 engaged with the base plate 60, as a stop. The detent pin 78 and the slot 76 are so arranged that when interengaged, the horizontal portion 20, of the post 16, extends forwardly or rearwardly, from the bracket 68, in line with the longitudinal centerline of the camper body C, and the mount 14 is prevented from rotating relative to the bracket 58.

In use and operation, the clamp assembly 42 is engaged over the transom 10 of the boat D, and the screws 52 are tightened, with the boat in a rearwardly declining position, as shown in phantom lines in FIGURE 1, the stop 24 being adjusted on and locked on the upper post portion 22, so that, the boat, when in loaded position, on the forward mount 12 and the rear mount 14, will be spaced above the tops of the cab B and the camper body C at a desired level.

The boat D is then grasped and moved upwardly, and to one side, so that the detent pin 78 moves out of the slot 76 and rides upon the upper end 70, of the tube 68, whereat the boat is further swung to said one side, and then pushed upwardly, to a level above the tops of the cab and the camper body, and then moved inwardly, onto the front mount; and then the rear part of the boat is let down, so as to engage the detent pin 78 in the slot 76. The weight of the rear part of the boat is then supported on the stop 24, and, in turn, by the post 16, bearing upon the base plate 60.

In the arrangement shown in FIGURES 4 to 6, the rear mount 14 is supported by a different form of bracket 58a, which is installed on the upper part of the rear wall 88, of the camper body C, in conjunction with a front mount 12 on the top of the cab B.

The bracket 58a comprises a flat vertical, transversely elongated base plate 60a, secured to the rear wall 88, by means such as self-threading screws 64a, in a horizontal position. A perpendicular tube 68a is fixed to the rear side of the base plate 60a, at the center thereof, and has an open upper end 70a, above the upper edge of the base plate. A stop bar 90 is secured across the lower end of the tube 68a, and the sidewall 72 of the tube is formed, at its lower end, with a drain hole 74a. The lower portion 18 of the post 16 of the rear mount 14, being properly proportioned in length, is adapted to be engaged in the tube 68a, to rest upon the stop bar 90.

Especially adapted for use with the bracket 58a, is a different form of rear mount 14a, which differs in construction from the mount 14 of FIGURES 1 to 3, only in that its post 16a is of a straight perpendicular form. A stop 24a and a clamp assembly 42a, similar to those of FIGURES 1 to 3, are associated with the post 16a.

In FIGURES 7 and 8, a further form of rear mount 14b is shown, which is similar to the mount 14a, except that the base plate 60b is positioned horizontally, and is fixed upon the top of an elongated, horizontal, transversely elongated bar 92, extending for the major part of the width of a car top (not shown). A backing plate 94, similar to the base plate 60b, and registered therewith, is engaged with the underside of the bar 92, and bolts 64b traverse the bar and both plates.

The bar 92 is adapted to be mounted upon a car top, by means of pendant feet 94, at the ends of the bar. The feet 94 comprise outwardly and downwardly angled arms 96 having straps 98 fixed on their upper ends and conformably and slidably engaged over the bar 92. The arms 96 have concave saddles 100, fixed on their lower ends, which conformably engage the concave side portions of a car top, and have outer edges 102, adapted to seat in rain gutters (not shown) associated with a car top.

A straight perpendicular post 16b extends upwardly from the base plate 60b, and is adapted to carry a stop 24b, and a rear mount like those of FIGURES 1 to 6.

What is claimed is:

1. In combination, a vehicle body having a top and a rear end, a front boat mount on the forepart of the top, a rear boat mount on the body at said rear end, said rear mount comprising a bracket fixed to the body, a post journaled on the bracket, and a boat transom clamp assembly journaled on the post, said bracket including a base plate fixed to the body, and a vertical tube fixed to the base plate, said post having a lower portion journalled in the tube, said post having an upper portion on which the clamp assembly is pivoted, said upper post portion being forwardly offset relative to the lower post portion, said tube having an upper end, a vertical detent slot in the tube opening to the upper end thereof, said lower post portion having a lateral detent pin adapted to engage in said slot only while the upper post portion is in a forwardly displaced position relative to the lower post portion and to ride upon the upper end of the tube in other rotated positions of the post.

2. The combination of claim 1, wherein said clamp assembly comprises a sleeve rotatably circumposed on the post, a vertically adjustable stop on the post upon which said sleeve is adapted to rest, and C-clamp means pivoted on said post.

3. A rear boat mount comprising a bracket having a base plate, a vertical tube fixed to the base plate, stop means extending across the lower end of the tube, said tube having an open upper end, a post having a lower portion rotatably-engaged in the tube with its lower end adapted to bear upon said stop means, said post having an upper portion, a sleeve journaled on said upper portion, a vertically adjustable stop on said upper portion upon which the sleeve is adapted to rest, said sleeve having a lateral arm adapted to extend forwardly relative to a vehicle top, and a boat transom clamp assembly pivoted on said arm, said post having a horizontal portion extending between the upper end of the lower post portion and the lower end of the upper post portion, said horizontal portion being adapted to extend forwardly relative to the lower post portion, said tube being formed in its sidewall with a detent slot opening to the upper end of the tube, said lower post portion having a lateral detent pin engageable in the detent slot in a selected position of rotation of the post relative to the tube, the pin at other times being adaped to ride upon the upper end of the tube.

4. A rear boat mount according to claim 3, wherein a transversely elongated bar has the base plate fixed centrally thereto, said bar having pendant feet at its ends, said feet having arcuate concave saddles on their lower ends adapted to conformably engage convex side portions of a car top, said saddles having outer edges adapted to seat in rain gutters of a car top.

References Cited

UNITED STATES PATENTS

| | | | |
|---|---|---|---|
| 2,772,799 | 12/1956 | Bridinger | 214—450 |
| 2,785,816 | 3/1957 | Fisher | 214—450 |
| 2,834,491 | 5/1958 | Wells | 214—450 |
| 2,885,102 | 5/1959 | Duncan | 214—450 |
| 2,895,628 | 7/1959 | Gebhart | 214—450 |
| 2,946,397 | 7/1960 | Berberich | 214—450 X |
| 2,963,184 | 12/1960 | Graef | 214—450 |

HUGO O. SCHULZ, *Primary Examiner.*